(12) United States Patent
Akaishi et al.

(10) Patent No.: US 11,396,242 B2
(45) Date of Patent: Jul. 26, 2022

(54) VEHICLE CONTROL DEVICE

(71) Applicants: TOYOTA JIDOSHA KABUSHIKI KAISHA, Toyota (JP); DENSO TEN Limited, Kobe (JP)

(72) Inventors: Takayuki Akaishi, Toyota (JP); Sunao Horitake, Toyota (JP); Kohei Takahashi, Toyota (JP); Yuhki Shiozumi, Kobe (JP)

(73) Assignees: TOYOTA JIDOSHA KABUSHIKI KAISHA, Toyota (JP); DENSO TEN Limited, Kobe (JP)

(*) Notice: Subject to any disclaimer, the term of this patent is extended or adjusted under 35 U.S.C. 154(b) by 75 days.

(21) Appl. No.: 17/000,521

(22) Filed: Aug. 24, 2020

(65) Prior Publication Data

US 2021/0061119 A1 Mar. 4, 2021

(30) Foreign Application Priority Data

Sep. 4, 2019 (JP) .............................. JP2019-161403

(51) Int. Cl.
*B60L 53/20* (2019.01)
*B60L 53/60* (2019.01)
*B60L 53/14* (2019.01)
*H02J 7/00* (2006.01)

(52) U.S. Cl.
CPC .............. *B60L 53/60* (2019.02); *B60L 53/14* (2019.02); *B60L 53/20* (2019.02); *H02J 7/0068* (2013.01); *B60L 2210/10* (2013.01)

(58) Field of Classification Search
CPC .......... B60L 53/60; B60L 53/20; B60L 53/14; B60L 2210/10; H02J 7/0068
See application file for complete search history.

(56) References Cited

U.S. PATENT DOCUMENTS

| 9,325,192 | B2* | 4/2016 | Fukui | ...................... B60L 53/65 |
| 9,517,765 | B2* | 12/2016 | Kato | ...................... B60W 10/08 |
| 2007/0194761 | A1 | 8/2007 | Yamaguchi et al. | |
| 2013/0134940 | A1* | 5/2013 | Tominaga | ............... B60L 53/65 |
| | | | | 320/109 |

FOREIGN PATENT DOCUMENTS

| JP | 2007-221970 A | 8/2007 |
| JP | 2017-093070 A | 5/2017 |

* cited by examiner

*Primary Examiner* — Dinh T Le
(74) *Attorney, Agent, or Firm* — Oliff PLC (57) ABSTRACT

A vehicle control device configured to control charge and discharge of a battery mounted on a vehicle includes an obtaining unit configured to obtain a parking time of the vehicle, a setting unit configured to derive a charge voltage of the battery based on at least the parking time obtained by the obtaining unit, and a voltage control unit configured to control charge of the battery based on the charge voltage of the battery derived by the setting unit when the vehicle is traveling.

14 Claims, 7 Drawing Sheets

FIG. 3

| | | COOLER BLOWER | | HEATER BLOWER | | HEADLAMP | | WIPER | | ... | PARKING TIME (RESERVATION STATE) | |
|---|---|---|---|---|---|---|---|---|---|---|---|---|
| | | ON | OFF | ON | OFF | ON | OFF | ON | OFF | | ≥ Nd | < Nd |
| GENERATED CURRENT | ≥ Ia | SEASON FACTOR (SUMMER: 2) | SEASON FACTOR (WINTER: 2) | SEASON FACTOR (WINTER: 2) | DAY/NIGHT FACTOR (NIGHT: 2) | DAY/NIGHT FACTOR (NIGHT: 2) | WEATHER FACTOR (HEAVY RAIN: 2) | WEATHER FACTOR (HEAVY RAIN: 2) | ... | | |
| | < Ia | ROAD CONDITION FACTOR (LOW ROTATION SPEED: 2) | | ROAD CONDITION FACTOR (LOW ROTATION SPEED: 2) | | ROAD CONDITION FACTOR (LOW ROTATION SPEED: 2) | | ROAD CONDITION FACTOR (LOW ROTATION SPEED: 2) | | ... | ROAD CONDITION FACTOR (LOW ROTATION SPEED: 2) | |
| INTERNAL RESISTANCE | ≥ Rb | SEASON FACTOR (WINTER: 2) | SEASON FACTOR (WINTER: 2) | SEASON FACTOR (WINTER: 2) | DAY/NIGHT FACTOR (NIGHT: 2) | DAY/NIGHT FACTOR (NIGHT: 2) | WEATHER FACTOR (HEAVY RAIN: 2) | WEATHER FACTOR (HEAVY RAIN: 2) | ... | | |
| | < Rb | TEMPERATURE FACTOR (LOW: 2) | TEMPERATURE FACTOR (LOW: 2) | TEMPERATURE FACTOR (LOW: 2) | TEMPERATURE FACTOR (LOW: 2) | TEMPERATURE FACTOR (LOW: 2) | TEMPERATURE FACTOR (LOW: 2) | TEMPERATURE FACTOR (LOW: 2) | ... | TEMPERATURE FACTOR (LOW: 2) | |
| TRAVELING TIME | ≥ Td | SEASON FACTOR (SUMMER: 2) | SEASON FACTOR (WINTER: 2) | SEASON FACTOR (WINTER: 2) | DAY/NIGHT FACTOR (NIGHT: 2) | DAY/NIGHT FACTOR (NIGHT: 2) | WEATHER FACTOR (HEAVY RAIN: 2) | WEATHER FACTOR (HEAVY RAIN: 2) | ... | | |
| | < Td | TRAVELING TIME FACTOR (SHORT: 2) | TRAVELING TIME FACTOR (SHORT: 2) | TRAVELING TIME FACTOR (SHORT: 2) | TRAVELING TIME FACTOR (SHORT: 2) | TRAVELING TIME FACTOR (SHORT: 2) | TRAVELING TIME FACTOR (SHORT: 2) | TRAVELING TIME FACTOR (SHORT: 2) | ... | TRAVELING TIME FACTOR (SHORT: 2) | |

FIG. 4

|  | TOTAL SCORE S |
|---|---|
| LEVEL 1 | $0 \leq S < L1$ |
| LEVEL 2 | $L1 \leq S < L2$ |
| LEVEL 3 | $L2 \leq S$ |

FIG. 5

|  | CORRECTION VOLTAGE (ADDED VOLTAGE) |
|---|---|
| LEVEL 1 | +0.3V |
| LEVEL 2 | +0.5V |
| LEVEL 3 | +1.0V |

FIG. 7

|  | | COOLER BLOWER | | HEATER BLOWER | | HEADLAMP | | WIPER | | OTHER | PARKING TIME (RESERVATION STATE) | |
|---|---|---|---|---|---|---|---|---|---|---|---|---|
|  | | ON | OFF | ON | OFF | ON | OFF | ON | OFF | ... | ≥ Nd | < Nd |
| GENERATED CURRENT | ≥ Ia | 1 | 0 | 1 | 0 | 1 | 0 | 1 | 0 | ... | 1 | 0 |
|  | < Ia | 2 | 1 | 2 | 1 | 2 | 1 | 2 | 1 | 0 | 2 | 1 |
| INTERNAL RESISTANCE | ≥ Rb | 2 | 1 | 2 | 1 | 2 | 1 | 2 | 1 | ... | 2 | 1 |
|  | < Rb | 1 | 0 | 1 | 0 | 1 | 0 | 1 | 0 | 0 | 1 | 0 |
| TRAVELING TIME | ≥ Td | 1 | 0 | 1 | 0 | 1 | 0 | 1 | 0 | 0 | 1 | 0 |
|  | < Td | 2 | 1 | 2 | 1 | 2 | 1 | 2 | 1 | ... | 2 | 1 |

FIG. 8

| | | COOLER BLOWER | | HEATER BLOWER | | HEADLAMP | | WIPER | | OTHER | | PARKING TIME (RESERVATION STATE) | |
|---|---|---|---|---|---|---|---|---|---|---|---|---|---|
| | | ON | OFF | ON | OFF | ON | OFF | ON | OFF | | | ≥ Nd | < Nd |
| GENERATED CURRENT | ≥ Ia | SEASON ×2 | | SEASON ×1 | | DAY/NIGHT ×1 | | WEATHER ×2 | | ... | ... | ROAD CONDITION ×2 | |
| | < Ia | ROAD CONDITION ×2 | | ROAD CONDITION ×2 | | ROAD CONDITION ×2 | | ROAD CONDITION ×2 | | ... | ... | | |
| INTERNAL RESISTANCE | ≥ Rb | SEASON ×1 | | SEASON ×1 | | DAY/NIGHT ×1 | | WEATHER ×2 | | ... | ... | TEMPERATURE ×1 | |
| | < Rb | TEMPERATURE ×1 | | TEMPERATURE ×1 | | TEMPERATURE ×1 | | TEMPERATURE ×1 | | ... | ... | | |
| TRAVELING TIME | ≥ Td | SEASON ×2 | | SEASON ×1 | | DAY/NIGHT ×1 | | WEATHER ×2 | | ... | ... | TRAVELING TIME ×1 | |
| | < Td | TRAVELING TIME ×1 | | TRAVELING TIME ×1 | | TRAVELING TIME ×1 | | TRAVELING TIME ×1 | | ... | ... | | |

FIG. 9

| | | COOLER BLOWER | | HEATER BLOWER | | HEADLAMP | | WIPER | | OTHER | PARKING TIME (RESERVATION STATE) | |
|---|---|---|---|---|---|---|---|---|---|---|---|---|
| | | ON | OFF | ON | OFF | ON | OFF | ON | OFF | ... | ≥ Nd | < Nd |
| GENERATED CURRENT | ≥ Ia | 2×2×2 = 8 | | 1×1×2 = 2 | | 1×1×2 = 2 | | 2×2×2 = 8 | | 0×... = 0 | 1×2 = 2 | |
| | < Ia | | | | | | | | | | | |
| INTERNAL RESISTANCE | ≥ Rb | 1×1×1 = 1 | | 0×1×1 = 0 | | 0×1×1 = 0 | | 1×2×1 = 2 | | 0×... = 0 | 0×1 = 0 | |
| | < Rb | | | | | | | | | | | |
| TRAVELING TIME | ≥ Td | 1×2×1 = 2 | | 0×1×1 = 0 | | 0×1×1 = 0 | | 1×2×1 = 2 | | 0×... = 0 | 0×1 = 0 | |
| | < Td | | | | | | | | | | | |

FIG. 10

VEHICLE CONTROL DEVICE

INCORPORATION BY REFERENCE

The disclosure of Japanese Patent Application No. 2019-161403 filed on Sep. 4, 2019 including the specification, drawings and abstract is incorporated herein by reference in its entirety.

BACKGROUND

1. Technical Field

The disclosure relates to a vehicle control device that controls charge and discharge of a battery mounted on the vehicle.

2. Description of Related Art

In recent years, electric power consumed by in-vehicle devices has been increased due to increased functionality and higher added value of vehicles. Thus, for a battery that is a power supply source for the in-vehicle devices, charge-discharge control is required for optimally maintaining a state of charge (SOC) of the battery to suppress the battery from running down.

Japanese Unexamined Patent Application Publication No. 2017-093070 (JP 2017-093070 A) describes control in which, when the state of charge of a battery for in-vehicle devices decreases while the vehicle is parked, the battery for the in-vehicle devices is charged with electric power of a high-voltage battery that is a power supply source for a traction motor. However, the control described in JP 2017-093070 A is not performed when the state of charge of the high-voltage battery is less than a predetermined value. Also, the control in JP 2017-093070 A is difficult to be applied to a vehicle on which the high-voltage battery is not mounted (for example, engine vehicle).

Thus, Japanese Unexamined Patent Application Publication No. 2007-221970 (JP 2007-221970 A) describes control for charging a battery in an early stage based on a state of a vehicle during use of the vehicle, in which a power supply system is operating.

SUMMARY

However, the control described in JP 2007-221970 A does not consider how the vehicle is used, that is, repeated short-time traveling (short trips), long-time parking, and the like. Short trips cannot secure sufficient charge time, and long-time parking may significantly decrease the state of charge due to discharge. Thus, even if the control described in JP 2007-221970 A is performed, the state of charge may be unable to become a predetermined target value during the use of the vehicle.

If the battery cannot be sufficiently charged during the use of the vehicle, the state of charge of the battery gradually decreases due to further repeated short trips or long-time parking, which may cause the battery to run down in the future. Thus, there is room for studying suitable charge control for the battery in order to suppress insufficient charge during the use of the vehicle.

The disclosure provides a vehicle control device that can suitably suppress decrease in a state of charge of a battery due to insufficient charge during use of a vehicle.

A first aspect of the disclosure relates to a vehicle control device configured to control charge and discharge of a battery mounted on a vehicle. The vehicle control device includes an obtaining unit configured to obtain a parking time of the vehicle, a setting unit configured to derive a charge voltage of the battery based on at least the parking time obtained by the obtaining unit, and a voltage control unit configured to control charge of the battery based on the charge voltage of the battery derived by the setting unit when the vehicle is traveling.

In the above first aspect, the setting unit may be configured to estimate a charge-discharge balance of the battery based on a state of use of the vehicle including at least the parking time, and configured to derive an evaluation value obtained by evaluating the charge-discharge balance according to a predetermined rule. The voltage control unit may be configured to control the charge voltage of the battery based on the evaluation value.

In the above first aspect, the parking time may be a duration of time for which a power supply of the vehicle was OFF most recently.

In the above first aspect, the vehicle may be a shared vehicle shared by a plurality of users, and the parking time may be a time period from a time when use of the vehicle is ended by a previous user to a time when use of the vehicle is started by a current user.

In the above first aspect, the vehicle may be a shared vehicle shared by a plurality of users, and the parking time may be a time period from a time when use of the vehicle is scheduled to be ended by a current user to a time when use of the vehicle is scheduled to be started by a next user.

The vehicle control device according to the above first aspect may further include a communication unit configured to communicate with a management center that manages usage of the shared vehicle. The obtaining unit may be configured to obtain, from the management center, the time when the use of the vehicle is ended by the previous user and the time when the use of the vehicle is started by the current user.

The vehicle control device according to the above first aspect may further include a communication unit configured to communicate with a management center that manages usage of the shared vehicle. The obtaining unit may be configured to obtain, from the management center, the time when the use of the vehicle is scheduled to be ended by the current user and the time when the use of the vehicle is scheduled to be started by the next user.

In the above first aspect, the obtaining unit may be configured to obtain vehicle information regarding the charge-discharge balance of the battery; and the setting unit may be configured to derive the evaluation value based on the parking time and the vehicle information.

In the above first aspect, the vehicle information may include a state of a discharge element related to discharge of the battery and a state of a charge element related to charge of the battery.

In the above first aspect, the discharge element may include a plurality of in-vehicle devices that consume electric power of the battery, and the state of the discharge element may include whether the in-vehicle devices are ON or OFF.

In the above first aspect, the charge element may include a generated current flowing toward the battery, an internal resistance of the battery, and a traveling time of the vehicle; and the state of the charge element may include whether the generated current, the internal resistance, and the traveling time are each equal to or greater than a predetermined threshold.

In the above first aspect, the obtaining unit may be configured to obtain, as the vehicle information, the traveling time of the vehicle from a departure point to a destination point. The traveling time of the vehicle may be set for the vehicle.

In the above first aspect, the parking time may be provided with a score in advance such that the score has a higher value as a duration of the parking time becomes longer and the score has a higher value when the state of the charge element is a state where an amount of charge to the battery is estimated to be small. Each of a plurality of the discharge elements may be provided with a score in advance such that the score has a higher value as an amount of discharge from the battery is larger and the score has a higher value when the state of the charge element is the state where the amount of charge to the battery is estimated to be small. The setting unit may be configured to calculate a total score by adding all of the score of the parking time and the score of each of the discharge elements, and configured to determine the evaluation value based on the total score. The score of each of the discharge elements may be a score provided in accordance with a current state of each of a plurality of the charge elements.

In the above first aspect, the obtaining unit may be configured to obtain vehicle environment information regarding an environment around the vehicle including at least one of a season, daytime or nighttime, weather, a temperature, a road condition, and a traveling time. The setting unit may be configured to assign a predetermined weight to the score of each of the discharge elements and the score of the parking time based on the vehicle environment information.

According to the first aspect, it is possible to suitably suppress decrease in the state of charge of the battery due to insufficient charge during the use of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 shows an example of a factor table;

DETAILED DESCRIPTION OF EMBODIMENTS

A vehicle control device according to the disclosure determines a state of use of a battery based on a parking time of a vehicle, an operating state of an in-vehicle device, a state of the vehicle, and a vehicle environment, and performs control such that a charge voltage of the battery during use of the vehicle becomes higher as the battery is used in a state where the battery is more likely to run down in the future. Thus, it is possible to suitably suppress decrease in a state of charge of the battery due to insufficient charge during the use of the vehicle.

Hereinafter, an embodiment of the disclosure will be described in detail with reference to the drawings.

Configuration

Figure 1:
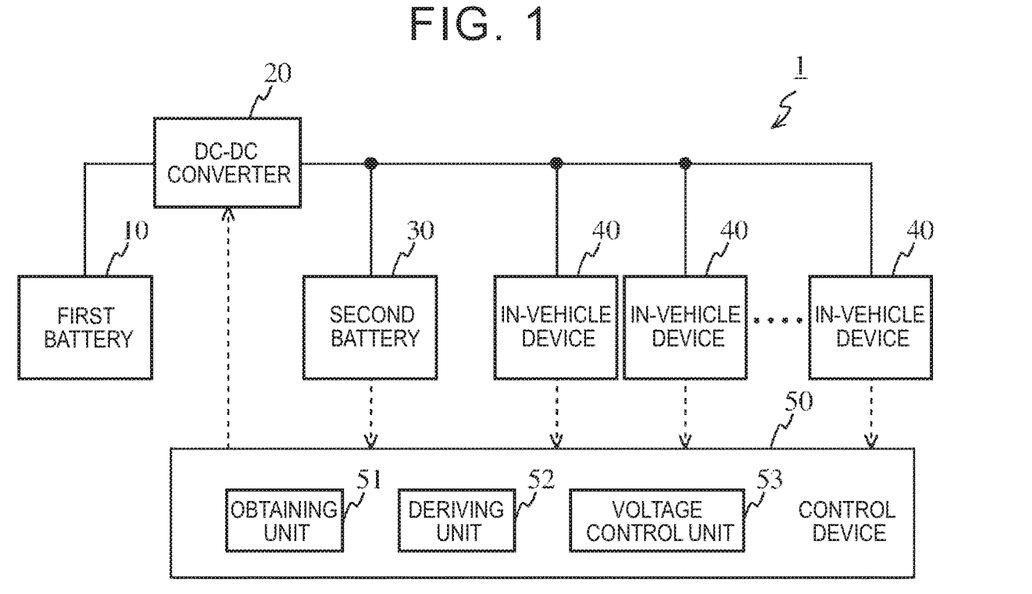
FIG. 1 is a schematic configuration diagram of a power supply system including a control device according to an embodiment of the disclosure.

FIG. 1 is a block diagram showing a schematic configuration of a power supply system including a vehicle control device according to the embodiment of the disclosure. A power supply system 1 illustrated in FIG. 1 includes a first battery 10, a direct current-direct current (DC-DC) converter 20, a second battery 30, a plurality of in-vehicle devices 40, and a control device 50 according to the present embodiment. The power supply system 1 is mounted on a hybrid vehicle (HV), a plug-in hybrid vehicle (PHV), an electric vehicle (EV), and the like using a motor as a power source. The first battery 10 is a high-voltage battery for supplying electric power to an electric motor (not shown) and the DC-DC converter 20. The first battery 10 may be configured to obtain electric power from an external power supply via a plug-in charger (not shown) that is connectable to the external power supply. As the first battery 10, a secondary battery such as a lithium ion battery configured to be chargeable and dischargeable is used.

The DC-DC converter 20 connects the first battery 10 with the second battery 30 and the in-vehicle devices 40, and supplies electric power of the first battery 10 to the second battery 30 and the in-vehicle devices 40. At the time of power supply, the DC-DC converter 20 can convert a high voltage of the first battery 10, which is an input voltage, into a predetermined low voltage based on a voltage command value provided from the control device 50 and output the low voltage.

The second battery 30 is a low-voltage battery that is charged with electric power output from the DC-DC converter 20 and that discharges its own power. As the second battery 30, a secondary battery such as a lead-acid battery or a lithium ion battery that is configured to be chargeable and dischargeable is used. The second battery 30 includes sensors for detecting various states of the battery such as voltage, current, and temperature, and can output detection results to the control device 50 described later.

The in-vehicle devices 40 are various devices mounted on the vehicle, which operate with electric power output from the DC-DC converter 20 and electric power of the second battery 30. Examples of the in-vehicle devices 40 include actuators such as motors and solenoids, lights such as headlamps and room lights, air conditioner such as heaters and coolers, steering devices and brakes, electronic control units (ECUs) for autonomous driving and advanced driving assistance, and other devices.

The control device 50 controls the DC-DC converter 20 based on predetermined information obtained from the second battery 30, the in-vehicle devices 40 and the like. The predetermined information may be transmitted via an in-vehicle network such as a controller area network (CAN) or may be transmitted via a dedicated signal line. The control device 50 of the present embodiment controls charge voltage output from the DC-DC converter 20 to the second battery 30 based on the state of use of the second battery 30 that can be determined from the predetermined information.

The control device 50 can be typically configured as an ECU including a processor, a memory, an input/output interface, and the like. The control device 50 may include some of or all of the ECUs mounted on the vehicle, such as an ECU that can control the DC-DC converter 20 and an ECU that can monitor the state of the second battery 30. In the control device 50 of the present embodiment, the processor reads a program stored in the memory and executes the program so as to implement functions of an obtaining unit 51, a deriving unit 52, and a voltage control unit 53 described below.

The obtaining unit 51 obtains, as the predetermined information, a parking time that is information about a time during which the vehicle is not used. The parking time is a time period from a time when the power supply system 1 is shut down (READY-OFF) after the use of the vehicle last time (end of the last trip) to a time when the power supply system 1 is started (READY-ON) to use the vehicle this time (start of the current trip), that is, a most recent duration for which the power supply of the vehicle is off. For example, when the last trip end time is 10:00 pm yesterday and the current trip start time is 9:00 am today, the parking time is 11 hours. When the vehicle is a shared vehicle shared by a plurality of users, the most recent parking time may be a time period from a time when the previous user ends using the vehicle to a time when the current user starts using the vehicle (actual parking time) or a time period from a time when the current user is scheduled to end using the vehicle to a time when the next user is scheduled to start using the vehicle (expected future parking time).

As long as the vehicle has a clock function, a timer function, and the like, the parking time can be obtained using the clock function and the timer function. When the vehicle is a shared vehicle, in addition, the obtaining unit 51 may communicate, via a communication unit (not shown) in the vehicle, with an external management center that can manage the usage of shared vehicles, so as to obtain an end time of the vehicle use by the previous user (actual time or reservation time), a start time of the vehicle use by the current user (actual time or reservation time), a scheduled end time of the vehicle use by the current user (reservation time), a scheduled start time of the vehicle use by the next user (reservation time).

The obtaining unit 51 can also obtain "vehicle information" that is information regarding a charge-discharge balance of the second battery 30 as the predetermined information. The vehicle information includes states of predetermined discharge elements related to discharge of the second battery 30 and states of predetermined charge elements related to charge of the second battery 30.

Examples of the discharge elements include a cooler blower, a heater blower, headlamps, a wiper, air-conditioning seats, electric fans, a defogger, a deicer, a seat heater, and a steering wheel heater, which are various in-vehicle devices 40 consuming electric power of the second battery 30. In this example, the states of the discharge elements may include whether the cooler blower is operating (ON) or is not operating (OFF), whether the heater blower is ON or OFF, whether the headlamps (light control system) are ON or OFF, and whether the wiper is ON or OFF. The obtaining unit 51 obtains the states of these discharge elements from the relevant in-vehicle devices 40. The above-mentioned parking time may also be included in the discharge elements.

Examples of the charge elements include a current flowing from the DC-DC converter 20 to the second battery 30 (generated current), an internal resistance of the second battery 30, and a traveling time of the vehicle. In this example, the states of the charge elements may include whether the generated current is equal to or greater than a threshold Ia, whether the internal resistance is equal to or greater than a threshold Rb, and whether the traveling time is equal to or greater than a threshold Td. The obtaining unit 51 can obtain the generated current and the internal resistance based on detection values of sensors included in the second battery 30. The obtaining unit 51 can also obtain the traveling time based on a traveling route from a departure point to a destination set by a navigation device mounted on the vehicle.

The obtaining unit 51 can also obtain, as the predetermined information, "vehicle environment information" that is information regarding an environment surrounding the vehicle in use from in-vehicle devices and various sensors mounted on the vehicle or from external facilities via communications. The vehicle environment information includes seasons, daytime or nighttime, weather, temperature, road conditions, traveling time, and the like.

The deriving unit 52 estimates the charge-discharge balance of the second battery 30 based on the state of use of the vehicle and derives a predetermined level that represents an evaluation value obtained by evaluating the estimated charge-discharge balance. The state of use of the vehicle includes the parking time obtained by the obtaining unit 51. The state of use of the vehicle may further include the vehicle information, and may further include the vehicle environment information. The level is derived based on the estimated charge-discharge balance of the second battery 30 according to a predetermined rule.

Figure 2:
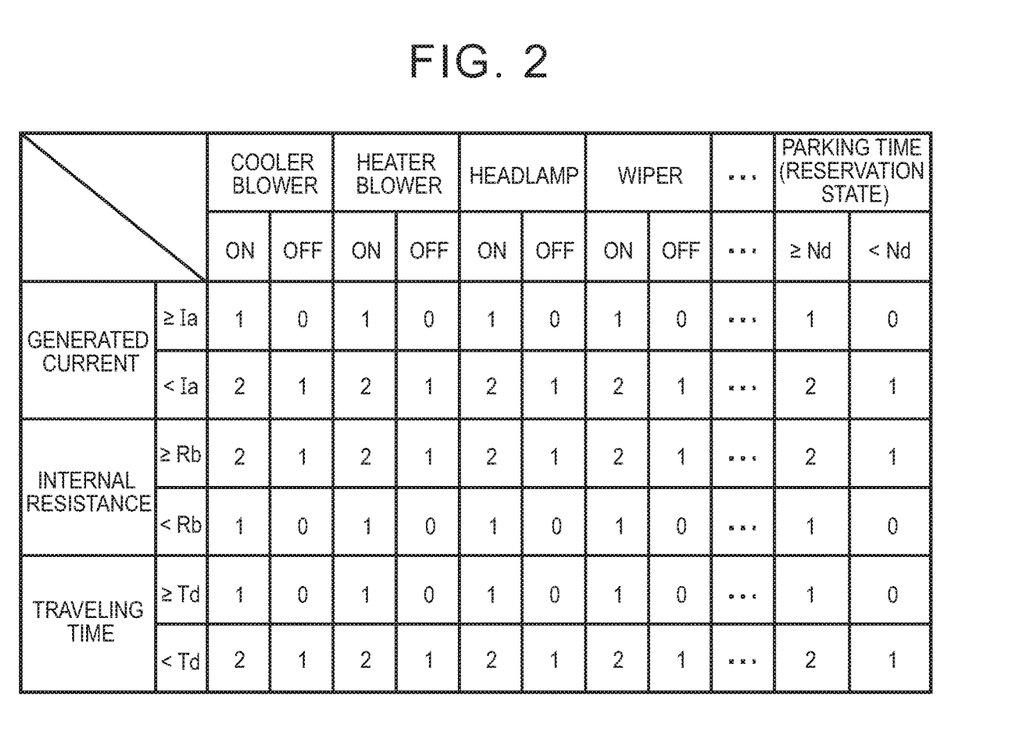
FIG. 2 shows an example of a score table.

For deriving the level, the deriving unit 52 originally has a score table in which scores are assigned to respective combinations of the states of discharge elements and the states of the charge elements. FIG. 2 shows an example of the score table. As shown in FIG. 2, the scores in the score table indicate a higher value as the duration of the parking time is longer (equal to or greater than threshold Nd). For the discharge elements other than the parking time, the scores indicate a higher value as the discharge amount from the second battery 30 is larger (when the discharge element is ON). For the charge elements, the scores in the score table indicate a higher value as the charge amount to the second battery 30 is estimated to be smaller (when the generated current is less than the threshold Ia, the internal resistance is equal to or greater than the threshold Rb, and the traveling time is less than the threshold Td). For the charge elements, the score of the score table may have a higher value when the state of the charge element is a state where an amount of charge to the second battery 30 is estimated to be small (when the generated current is less than the threshold Ia, the internal resistance is equal to or greater than the threshold Rb, and the traveling time is less than the threshold Td) than when the state of the charge element is a state where an amount of charge to the second battery 30 is estimated to be large (when the generated current is equal to or greater than the threshold Ia, the internal resistance is less than the threshold Rb, and the traveling time is equal to or greater than the threshold Td).

For example, focusing only on the cooler blower function, the score is determined based on the cooler blower and the generated current as follows: when the cooler blower is OFF and the generated current is equal to or greater than the threshold Ia, it is estimated that no electric power is discharged from the second battery 30 and the second battery 30 is efficiently charged, and thus, the score should be "0". However, when the cooler blower is OFF but the generated current is less than the threshold Ia, or when the generated current is equal to or greater than the threshold Ia but the cooler blower is ON, the charge pace of the second battery 30 may decrease, and thus, the score should be "1". If the cooler blower is ON and the generated current is less than the threshold Ia, the charge pace of the second battery 30 may further decrease or the state of the second battery 30 may be switched to the discharge state.

Note that, in the above example, the case has been described where the parking time is divided into two types, that is, the parking time equal to or greater than the threshold or the parking time less than the threshold. However, the parking time may be divided into three or more types by setting a plurality of thresholds to provide the scores. Also, the case has been described where each of the states of the discharge elements other than the parking time is divided into two states, namely, an ON state and an OFF state. However, the ON state may be divided into a plurality of states such as Hi, Mid, and Lo to provide the scores. The case has been described where each of the states of the charge elements is divided into two states, that is, the charge element is equal to or greater than the threshold or the charge element is less than the threshold. However, the state of the charge element may be divided into three or more states by setting a plurality of thresholds to provide the scores. Further, a value different from 0, 1, or 2 may be provided as the scores. Since the discharge elements and charge elements are considered to be different between vehicles, it is preferable to have an appropriate score table suitable for the devices of the vehicle.

The deriving unit 52 originally has a factor table that weights the scores in accordance with the vehicle environment estimated to affect the charge and discharge of the second battery 30, for each combination of the discharge element and the charge element in the score table. FIG. 3 shows an example of the factor table. As shown in FIG. 3, in the factor table, items of the vehicle environment that are estimated to affect the charge and discharge of the second battery 30 and factors thereof are assigned in advance to the discharge elements and the charge elements.

For example, a season factor for the cooler blower in terms of the generated current and the traveling time is set to two for the summer season in which the operating time tends to be long, while being set to one for the other seasons. As for the internal resistance, the season factor for the cooler blower is set to two for the winter season in which the outside temperature is low and the resistance value rises, while being set to one for the other seasons. The season factor for the heater blower in terms of the generated current and the traveling time is set to two for the winter season in which the operating time tends to be long, while being set to one for the other seasons. As for the internal resistance, the season factor for the heater blower is set to two for the winter season in which the outside temperature is low and the resistance value rises, while being set to one for the other seasons. A day/night factor for the headlamps (light control system) is set to two for nighttime in which the lighting frequency is high, while being set to one for other times. A weather factor for the wiper is set to two for the case where heavy rain is expected that causes the operating speed of the wiper to increase, while being set to one for the other cases. A road condition factor commonly provided for the discharge elements in terms of the generated current is set to two for the case where the rotation speed of the motor tends to be low due to high-speed traveling or traffic congestion, while being set to one for the other cases. A temperature factor commonly provided for the discharge elements in terms of the internal resistance is set to two for the case of low temperature regardless of the season, while being set to one for the other cases. A traveling time factor commonly provided for the discharge elements in terms of the traveling time is set to two for the case where the traveling time is shorter than the threshold Td, while being set to one for the other cases.

In the above-described example, the case where one or two kinds of factors are set for each combination of the discharge element and the charge element has been described, but three or more kinds of factors may be set. Further, a plurality of factors may be set for each kind, and the factor may have a value of three or more. Whether the condition for setting the factor larger such as summer time, winter time, nighttime, heavy rain, low rotation speed, low temperature, or short time is satisfied can be determined by comparing the vehicle environment information (month, day, time, illuminance, amount of rainfall, weather, engine rotation speed, outside temperature, traveling trajectory, etc.) with predetermined reference values. The vehicle environment information is obtained by the obtaining unit 51 from the in-vehicle devices and various sensors mounted on the vehicle or via communications with external facilities.

Figure 4:
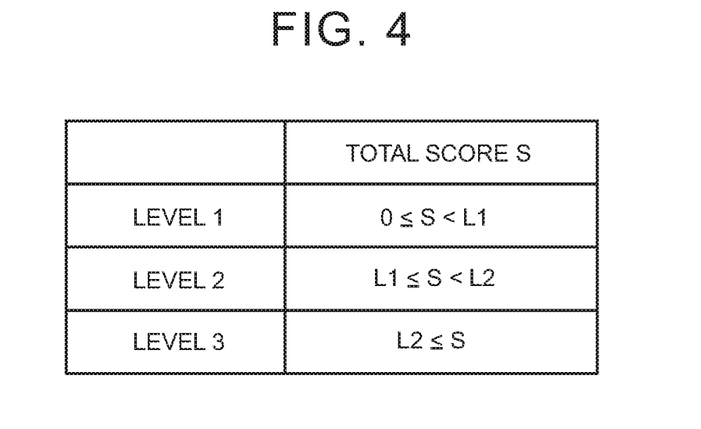
FIG. 4 is an example of a level table.

The deriving unit 52 calculates a total score S, according to a predetermined rule described later, based on the score table and the factor table, and determines a level obtained by evaluating the charge-discharge balance of the second battery 30 based on the calculated total score S. The level is determined based on a level table originally included in the deriving unit 52. FIG. 4 shows an example of the level table. In the example of FIG. 4, when the total score S is less than a threshold L1, the charge-discharge balance of the second battery 30 is determined as "level 1", when the total score S is equal to or greater than the threshold L1 and less than a threshold L2, the charge-discharge balance of the second battery 30 is determined as "level 2", and when the total score S is equal to or greater than the threshold L2, the charge-discharge balance of the second battery 30 is determined as "level 3". In the present embodiment, the level is set so as to increase as a possibility increases that the second battery 30 may run down if the vehicle continues to be used as it is, that is, as the total score S increases. The threshold L1 and the threshold L2 are set in advance in accordance with the type of the vehicle.

Figure 5:
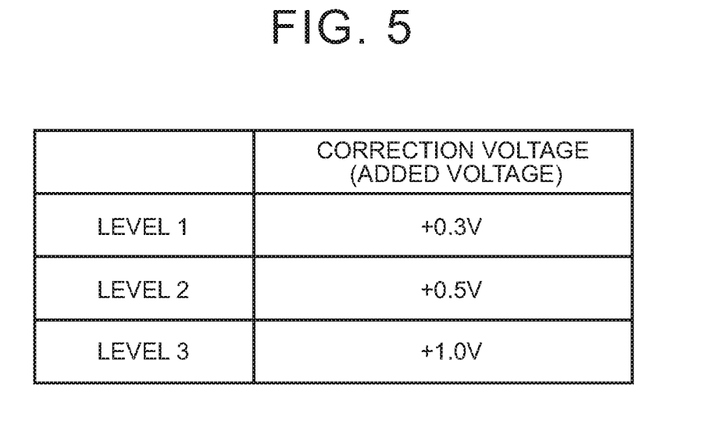
FIG. 5 shows an example of a correction voltage table.

The voltage control unit 53 determines a correction voltage to be added to the current charge voltage output by the DC-DC converter 20, in accordance with the level obtained by evaluating the charge-discharge balance of the second battery 30 determined by the deriving unit 52. The correction voltage is determined based on a correction voltage table originally included in the voltage control unit 53. FIG. 5 shows an example of the correction voltage table. In the example of FIG. 5, the correction voltage is determined as "+0.3 V" when the charge-discharge balance of the second battery 30 is level 1, the correction voltage is determined as "+0.5 V" when the charge-discharge balance of the second battery 30 is level 2, and the correction voltage is determined as "+1.0 V" when the charge-discharge balance of the second battery 30 is level 3. In the present embodiment, the level is set such that the correction voltage increases as a state of charge of the second battery 30 leans toward discharge. That is, the correction voltage is set such that the correction is made to increase the charge voltage as the possibility increases that the second battery 30 may run down. The correction voltage suppresses the second battery 30 from running down.

The value of each correction voltage may be fixedly set in advance, or may be set each time the vehicle is used (the power supply system operates). In the latter case, it is possible to set the correction value such that the second battery 30 is charged to a target state of charge by the time when the vehicle arrives at the destination, based on the traveling time calculated from the traveling route set by the navigation device and the current state of charge of the second battery 30.

Then, the voltage control unit 53 provides the DC-DC converter 20 with a voltage command value for adding the determined correction voltage to the charge voltage currently output by the DC-DC converter 20, so as to control the charge voltage output by the DC-DC converter 20.

Control

Figure 6:
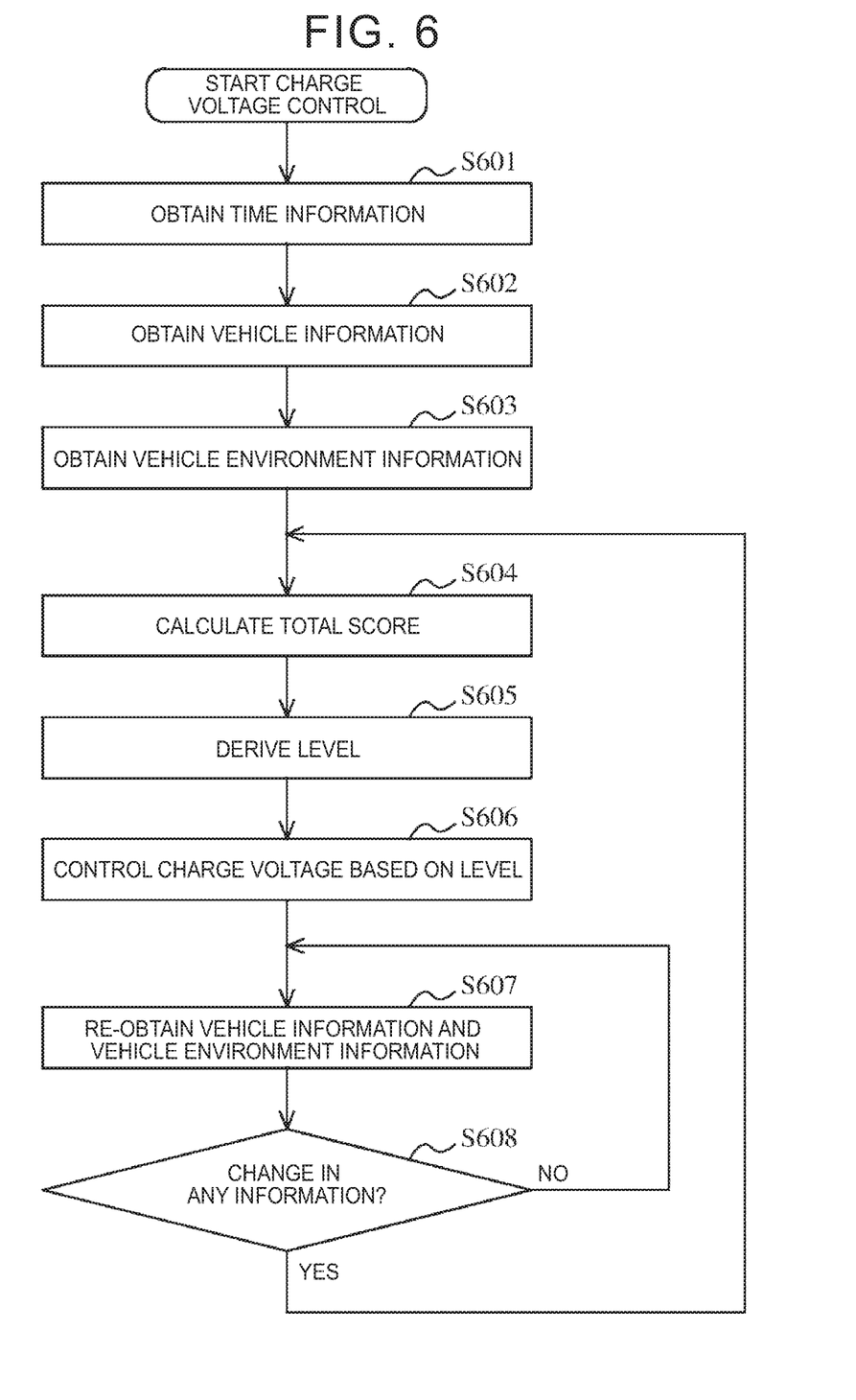
FIG. 6 is a flowchart illustrating a charge voltage control process performed by the control device according to the embodiment.
Figure 7:
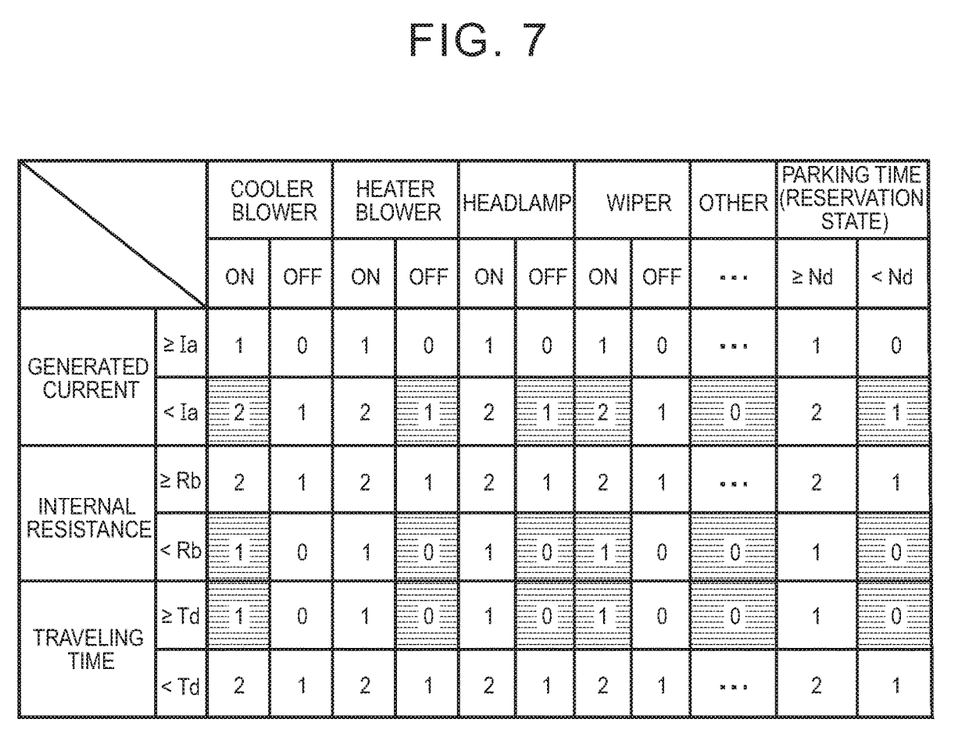
FIG. 7 shows a specific example of extracting each score from the score table.
Figure 8:
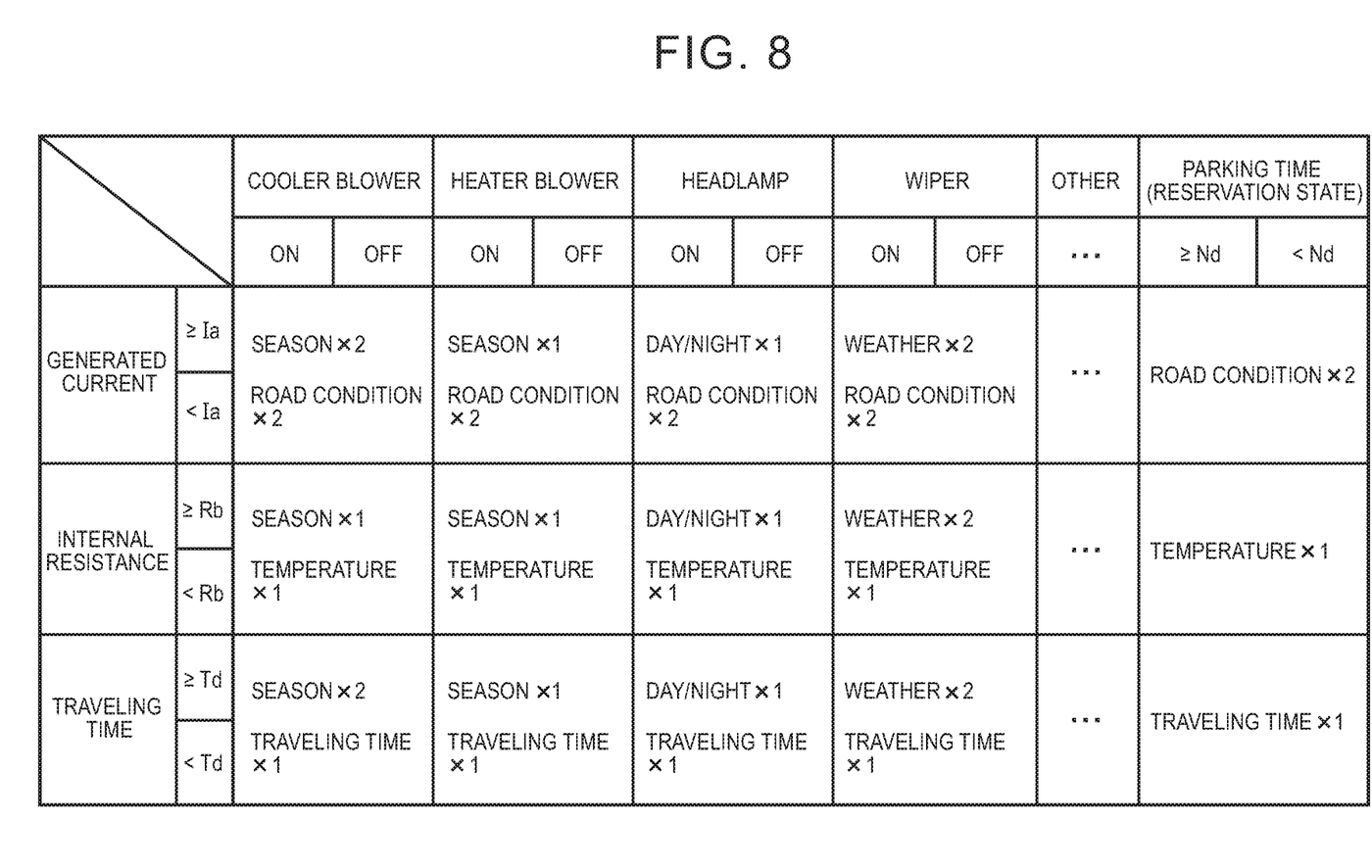
FIG. 8 shows a specific example of setting each factor in the factor table.
Figure 9:
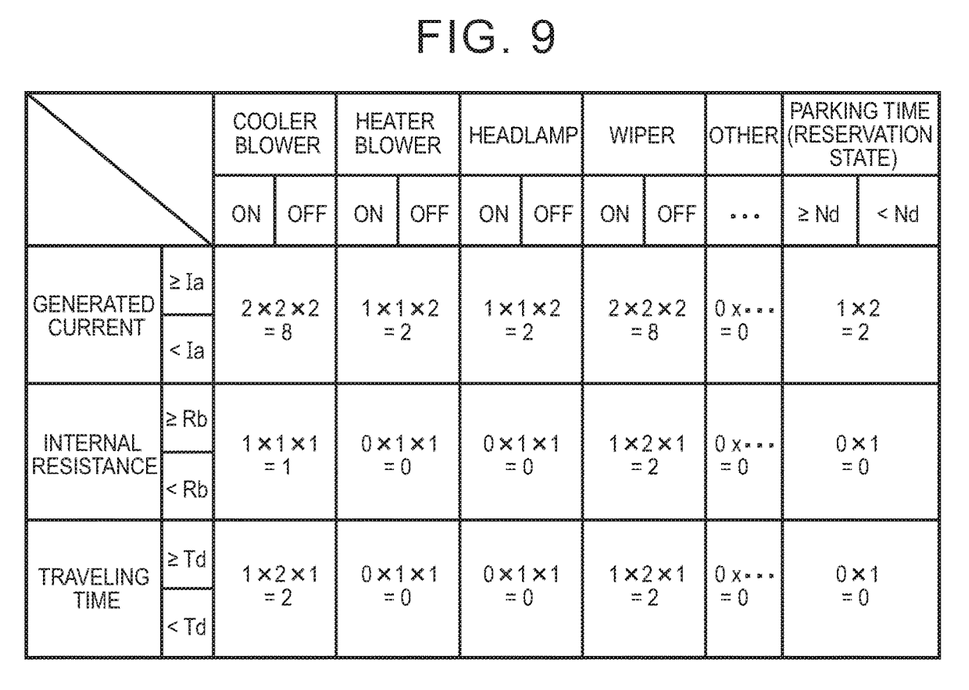
FIG. 9 shows a specific example of obtaining a total score.

Next, control performed by the control device 50 according to the embodiment will be described with further reference to FIGS. 6 to 9. FIG. 6 is a flowchart illustrating a process procedure of charge voltage control performed by the control device 50 according to the embodiment. FIG. 7 shows a specific example of extracting each score from the score table. FIG. 8 shows a specific example of setting each factor in the factor table. FIG. 9 shows a specific example of obtaining the total score.

The charge voltage control shown in FIG. 6 is started with a start-up of the power supply system 1 (READY-ON) and repeatedly performed until a shut-off of the power supply system 1 (READY-OFF) when the vehicle is a hybrid vehicle or an electric vehicle (EV).

Step S601

The obtaining unit 51 of the control device 50 obtains the parking time during which the vehicle is not used. In the present embodiment, it is assumed that a most recent parking time T (<threshold Nd) has been obtained as the parking time.

Step S602

The obtaining unit 51 of the control device 50 obtains the vehicle information regarding the charge-discharge balance of the second battery 30. In the present embodiment, it is assumed that the following information has been obtained as the vehicle information.

Cooler blower: ON
Heater blower: OFF
Headlamps: OFF
Wiper: ON
Generated current: less than threshold Ia
Internal resistance: less than threshold Rb
Traveling time: equal to or greater than threshold Td Step S603

The obtaining unit 51 of the control device 50 obtains the vehicle environment information regarding the environment around the vehicle in use. In the present embodiment, it is assumed that the following information has been obtained as the vehicle environment information.

Time: daytime
Season: summer
Weather: heavy rain
Temperature: high temperature
Engine rotation speed: low
Traveling time: long time Note that the order of the processes of steps S601 to S603 for obtaining each information may be interchanged or the processes may be performed in parallel.

Step S604

The deriving unit 52 of the control device 50 calculates the total score S as follows based on the parking time, the vehicle information, and the vehicle environment information obtained by the obtaining unit 51.

First, the deriving unit 52 extracts the scores to be used for calculation from the score table (FIG. 2) based on the parking time and the vehicle information obtained by the obtaining unit 51. In the example of the information described above, the scores with shading in FIG. 7 are extracted as the scores to be used for the calculation. Note that the description will be made assuming that the scores of the discharge element indicated as "other" in FIG. 7 are "0" regardless of its state. Next, the deriving unit 52 determines each factor in the factor table (FIG. 3) based on the vehicle environment information obtained by the obtaining unit 51. In the example of the information described above, each factor is determined as shown in FIG. 8. The deriving unit 52 determines a plurality of scores by multiplying each of the scores extracted from the score table by the corresponding factor, and determines the total score S by calculating a total of the obtained scores. FIG. 9 shows a method of calculating the total score S in the example of the above information. In this example, "29" is obtained as the total score S. The calculation formula for calculating the total score S in this example is "8+2+2+8+0+2+1+0+0+2+0+0+2+0+0+2+0+0".

Step S605

The deriving unit 52 of the control device 50 derives the level obtained by evaluating the charge-discharge balance of the second battery 30 based on the obtained total score S (=29). For example, in the level table shown in FIG. 4, when the total score S is in the range of L1 or greater and less than L2, level 2 is derived as the charge-discharge balance of the second battery 30.

Step S606

The voltage control unit 53 of the control device 50 controls the charge voltage output by the DC-DC converter 20 based on the level derived by the deriving unit 52. In the above example, the voltage control unit 53 extracts the correction voltage "+0.5 V" assigned to level 2 from the correction voltage table shown in FIG. 5. Then, the voltage control unit 53 controls the voltage command value of the DC-DC converter 20 such that when the current charge voltage of the DC-DC converter 20 is 12.0 V, for example, the corrected charge voltage becomes 12.5 V which includes the added correction voltage "+0.5 V".

Step S607

After the control of the charge voltage of the DC-DC converter 20 is started, the obtaining unit 51 of the control device 50 obtains the vehicle information and the vehicle environment information again.

Step S608

The obtaining unit 51 of the control device 50 determines whether there is a difference between the vehicle information that is re-obtained this time and the vehicle information that was obtained last time (i.e., there is a change in the vehicle information) and whether there is a difference between the vehicle environment information that is re-obtained this time and the vehicle environment information that was obtained last time (i.e., there is a change in the vehicle environment information). Examples of the case where the obtaining unit 51 determines that there is a change in the vehicle information include a case where the ON/OFF state of the discharge element changes, and a case where the state of the charge element significantly changes beyond the threshold. Examples of the case where the obtaining unit 51 determines that there is a change in the vehicle environment information include a case where day turns to night and a case where weather changes from rain to sun. When there is a change in any of the information (step S608, Yes), the process proceeds to step S604. Otherwise (step S608, No), the process proceeds to step S607.

Application Example

Figure 10:
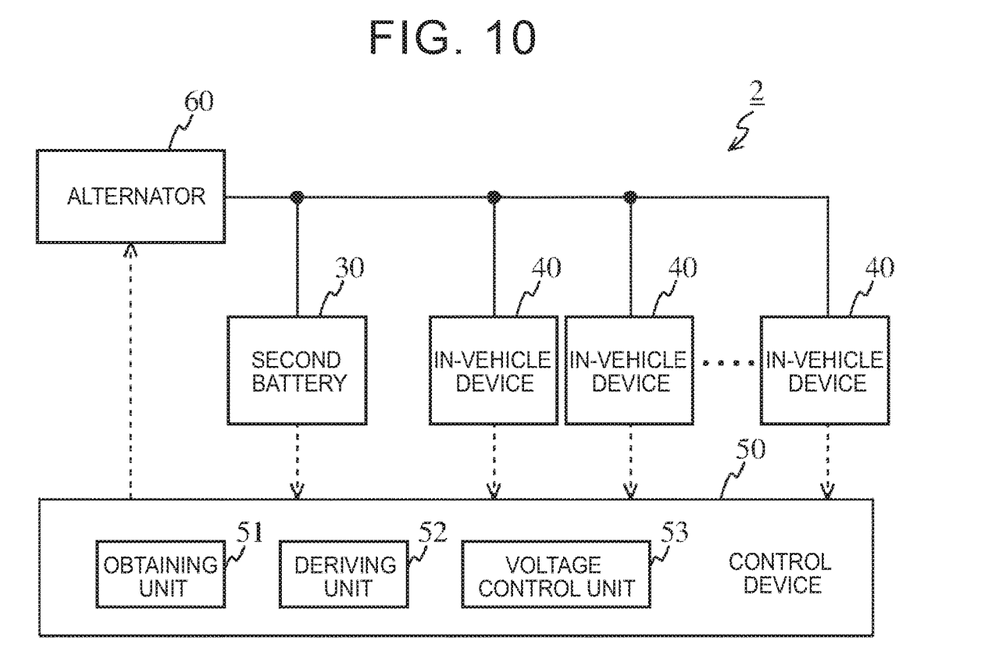
FIG. 10 is a schematic configuration diagram of a power supply system including the vehicle control device according an application example of the embodiment.

FIG. 10 is a block diagram showing a schematic configuration of a power supply system including the vehicle control device according to an application example of the disclosure. A power supply system 2 shown in FIG. 10 has a configuration in which an alternator 60 is provided instead of the first battery 10 and the DC-DC converter 20 in the power supply system 1 described above. The power supply system 2 is mounted on an engine vehicle that does not use an electric motor as a power source.

The alternator 60 is a generator that generates electric power by converting torque generated with driving of an engine (not shown) into electric energy. The alternator 60 can output, to the second battery 30 and the in-vehicle devices 40, the generated power of the charge voltage that is based on the voltage command value provided from the control device 50.

The control device 50 uses the parking time, the vehicle information, and the vehicle environment information obtained from the second battery 30, the in-vehicle devices 40 and the like to control the charge voltage output by the alternator 60 to the second battery 30 based on the evaluation of the charge-discharge balance of the second battery 30. In the case of the application example, the rotation speed of the engine is employed, instead of the rotation speed of the motor, as the road condition factor commonly provided for the discharge elements in terms of the generated current. Note that the control performed by the control device 50 on the alternator 60 can be easily understood by replacing the "DC-DC converter 20" in the above description with the "alternator 60".

Operations/Effects

As described above, the control device 50 according to the embodiment of the disclosure estimates the charge-discharge balance of the second battery 30 based on at least the most recent parking time and controls the DC-DC converter 20 or the alternator 60 so that the charge voltage of the battery 30 increases as the parking time increases.

With this control, when the parking time is longer than the predetermined time and the decrease in state of charge of the second battery 30 is estimated to be large, the charge voltage of the second battery 30 is increased and thus the charge speed can be increased, compared with a case where the parking time is shorter than the predetermined time and the decrease in state of charge of the second battery 30 is not estimated to be so large. Accordingly, it is expected that the state of charge of the second battery 30 can be restored to the same state after using the vehicle for the same time in both the former case and the latter case. Therefore, regardless of the state of charge of the second battery 30, it is possible to suitably suppress decrease in the state of charge of the second battery 30 due to insufficient charge during the use of the vehicle, and thus possible to suppress running down of the battery in the future.

When the vehicle is a shared vehicle shared by a plurality of users, the control device 50 can obtain the actual time and the scheduled time of start/end of use of the vehicle by the previous user, the current user, and the next user from the external management center or the like to accurately estimate the charge-discharge balance of the second battery 30. Therefore, the control device 50 can suitably control the charge voltage of the second battery 30. In particular, by obtaining the future parking time in advance, it is possible to suitably control the state of charge of the second battery 30 before the parking time is started, which can effectively suppress the battery from running down during the parking time.

Further, with the control device 50 according to the embodiment of the disclosure, the charge-discharge balance of the second battery 30 is estimated further based on the vehicle information regarding the charge-discharge balance of the second battery 30 and the vehicle environment information regarding the environment around the vehicle in use, and the DC-DC converter 20 or the alternator 60 is controlled such that the charge voltage of the second battery 30 increases as the charge efficiency of the second battery 30 decreases (as the state of charge of the second battery 30 leans toward discharge).

Also with this control, it is expected that the state of charge of the second battery 30 can be restored by the time when the use of the vehicle is ended, regardless of the state of charge of the second battery 30 at the time when the use of the vehicle is started. Thus, it is possible to suitably suppress decrease in the state of charge of the second battery 30 due to insufficient charge during use of the vehicle, and thus possible to suppress the battery from running down in the future.

In addition, the charge voltage control performed by the control device 50 can be implemented in existing vehicles only by updating charge voltage control software without changing a hardware configuration. Therefore, it is possible to reduce an introduction cost.

Although the embodiment of the disclosure has been described above, the disclosure can be construed as a charge voltage control method performed by a control device, a control program thereof, a computer-readable, non-transitory storage medium storing the control program, and a vehicle on which the control device is mounted.

The vehicle control device of the disclosure can be used for vehicles having a battery that cannot be charged during parking, such as hybrid vehicles, plug-in hybrid vehicles, electric vehicles, and engine vehicles.

What is claimed is:

1. A vehicle control device comprising:
   a first battery;
   a converter coupled to receive power from the first battery to charge and discharge a second battery mounted on a vehicle;
   an obtaining unit configured to obtain a parking time of the vehicle when the vehicle is not used;
   a deriving unit configured to derive a charge-discharge balance of the second battery based on at least the parking time obtained by the obtaining unit; and
   a voltage control unit configured to control charge voltage output to the second battery by the converter.

2. The vehicle control device according to claim 1, wherein:
   the deriving unit is configured to
      derive an evaluation value obtained by evaluating the charge-discharge balance according to a predetermined rule; and
   the voltage control unit is configured to control the charge voltage output to the second battery based on the evaluation value.

3. The vehicle control device according to claim 1, wherein the parking time is a duration of time for which a power supply of the vehicle was OFF most recently.

4. The vehicle control device according to claim 1, wherein:
   the vehicle is a shared vehicle shared by a plurality of users; and
   the parking time is a time period from a time when use of the vehicle is ended by a previous user to a time when use of the vehicle is started by a current user.

5. The vehicle control device according to claim 1, wherein:
the vehicle is a shared vehicle shared by a plurality of users; and
the parking time is a time period from a time when use of the vehicle is scheduled to be ended by a current user to a time when use of the vehicle is scheduled to be started by a next user.

6. The vehicle control device according to claim 4, further comprising a communication unit configured to communicate with a management center that manages usage of the shared vehicle, wherein
the obtaining unit is configured to obtain, from the management center, the time when the use of the vehicle is ended by the previous user and the time when the use of the vehicle is started by the current user.

7. The vehicle control device according to claim 5, further comprising a communication unit configured to communicate with a management center that manages usage of the shared vehicle, wherein
the obtaining unit is configured to obtain, from the management center, the time when the use of the vehicle is scheduled to be ended by the current user and the time when the use of the vehicle is scheduled to be started by the next user.

8. The vehicle control device according to claim 2, wherein:
the obtaining unit is configured to obtain vehicle information regarding the charge-discharge balance of the second battery; and
the deriving unit is configured to derive the evaluation value based on the parking time and the vehicle information.

9. The vehicle control device according to claim 8, wherein the vehicle information includes a state of a discharge element related to discharge of the second battery and a state of a charge element related to charge of the second battery.

10. The vehicle control device according to claim 9, wherein the discharge element includes a plurality of in-vehicle devices that consume electric power of the second battery, and the state of the discharge element includes whether the in-vehicle devices are ON or OFF.

11. The vehicle control device according to claim 9, wherein:
the charge element includes a generated current flowing toward the second battery, an internal resistance of the second battery, and a traveling time of the vehicle; and
the state of the charge element includes whether the generated current, the internal resistance, and the traveling time are each equal to or greater than a predetermined threshold.

12. The vehicle control device according to claim 11, wherein the obtaining unit is configured to obtain, as the vehicle information, the traveling time of the vehicle from a departure point to a destination point, the traveling time of the vehicle being set for the vehicle.

13. The vehicle control device according to claim 9, wherein:
the parking time is provided with a score in advance such that the score has a higher value as a duration of the parking time becomes longer and the score has a higher value when the state of the charge element is a state where an amount of charge to the second battery is estimated to be small;
each of a plurality of the discharge elements is provided with a score in advance such that the score has a higher value as an amount of discharge from the second battery is larger and the score has a higher value when the state of the charge element is the state where the amount of charge to the second battery is estimated to be small; and
the deriving unit is configured to
calculate a total score by adding all of the score of the parking time and the score of each of the discharge elements, the score of each of the discharge elements being a score provided in accordance with a current state of each of a plurality of the charge elements, and
determine the evaluation value based on the total score.

14. The vehicle control device according to claim 13, wherein:
the obtaining unit is configured to obtain vehicle environment information regarding an environment around the vehicle including at least one of a season, daytime or nighttime, weather, a temperature, a road condition, and a traveling time; and
the deriving unit is configured to assign a predetermined weight to the score of each of the discharge elements and the score of the parking time based on the vehicle environment information.

* * * * *